Patented Nov. 23, 1926.

1,608,288

UNITED STATES PATENT OFFICE.

JEAN ALTWEGG, OF LYON, FRANCE, ASSIGNOR TO SOCIÉTÉ CHIMIQUE DES USINES DU RHONE, OF PARIS, FRANCE.

PROCESS OF MANUFACTURE OF CALCIUM ARSENATE.

No Drawing. Application filed June 16, 1923, Serial No. 645,921, and in France April 27, 1923.

The present invention is based on the discovery that calcium arsenite, although insoluble, may be transformed into calcium arsenate by treatment with chloride of lime. The chloride of lime may be generated within the mass of the reacting mixture.

This process is susceptible of numerous variations.

In one particular method of manufacture, according to this invention, calcium arsenite is energetically stirred with warm water and chloride of lime is added. The whole of the calcium arsenite is transformed into calcium arsenate and the calcium chloride formed dissolves and can be easily separated by filtration.

As an alternative, a quantity of lime sufficient to form finally chloride of calcium may be added to an aqueous suspension of calcium arsenite; chlorine is then passed through with stirring, and absorbed. The chlorine need not be pure or concentrated and gaseous mixtures only containing a small percentage of chlorine may be used successfully.

The reaction temperature may be varied within wide limits. A too low temperature has for sole inconvenience to diminish considerably the speed of the reaction, while near the boiling point of the mixture frothing may take place to an objectionable extent. Preferably, therefore, an intermediate temperature between 60° and 80° C. is selected.

When carrying out this process the quantity of lime necessary to obtain arsenate of calcium in the pure state may be calculated, but as far as the reaction or the agricultural use of the product are concerned, no inconvenience arises from an excess of lime.

The suspended arsenite of calcium necessary to the reaction may be prepared at once by the action of quick lime upon an arsenious acid or arsenious oxide ($As_2O_3$). The latter operation may be performed, for instance, as follows: About 5,000 litres of water are heated to about 70° C. in an open vat, 1,000 kilogrammes of arsenious oxide and 350 kilogrammes of slaked lime at 98% are added with stirring, and subsequently 3,000 kilogrammes of chloride of lime containing 24% of active chlorine and 26% of free lime, are added gradually, stirring being continued. On termination of the reaction, the calcium arsenate formed is obtained by filtration and dried.

The same result would be obtained by mixing the 1,000 kilogrammes of arsenious oxide with 1,900 kilogrammes of slaked lime in 6,000 litres of water, and causing the mixture, well stirred and raised to a temperature of about 80° C., to absorb 700 kilogrammes of gaseous chlorine.

This new process allows of the production of calcium arsenate by a single extremely simple operation. One may use chloride of lime with a small percentage of active chlorine without complicating the operation, affecting the yield or increasing the by-products.

The calcium arsenate obtained by this process and dried in any suitable manner has the appearance of an extremely brittle body, crumbling into an impalpable flour; it is therefore adapted for immediate use for agricultural purposes without previous grinding.

What I claim and desire to secure by Letters Patent is:—

1. A process of manufacture of calcium arsenate consisting in causing chloride of lime to react with calcium arsenite in aqueous suspension and separating the resulting arsenate from the calcium chloride by filtration.

2. Process of manufacture of calcium arsenate which consists in causing chloride of lime to react upon calcium arsenite in aqueous suspension.

3. Process of manufacture of calcium arsenate, which consists in causing chloride of lime to react upon a warmed suspension of arsenious acid ($As_2O_3$) and slaked lime, and separating the arsenate formed by filtration.

4. Process of manufacture of calcium arsenate which consists in causing 3,000 kg. of chloride of lime of 24% active chlorine and 26% free lime to react upon a warmed and well-stirred suspension of 1,000 kg. arsenious oxide and at least 350 kg. slaked lime of 98% and separating the arsenate formed by filtration.

In testimony whereof I have signed my name to this specification.

JEAN ALTWEGG.